US012517767B2

(12) United States Patent
Devarakonda et al.

(10) Patent No.: US 12,517,767 B2
(45) Date of Patent: Jan. 6, 2026

(54) MANAGING EVENTS FOR SERVICES OF A CLOUD PLATFORM IN A HYBRID CLOUD ENVIRONMENT

(71) Applicant: VMware, Inc., Palo Alto, CA (US)

(72) Inventors: Kalyan Devarakonda, Bangalore (IN); Praveen Tirumanyam, Bangalore (IN)

(73) Assignee: VMware LLC, Palo Alto, CA (US)

( * ) Notice: Subject to any disclaimer, the term of this patent is extended or adjusted under 35 U.S.C. 154(b) by 669 days.

(21) Appl. No.: 17/899,288

(22) Filed: Aug. 30, 2022

(65) Prior Publication Data

US 2024/0069981 A1 Feb. 29, 2024

(51) Int. Cl.
*G06F 9/455* (2018.01)
*G06F 9/50* (2006.01)

(52) U.S. Cl.
CPC ........ *G06F 9/5077* (2013.01); *G06F 9/45558* (2013.01); *G06F 2009/45575* (2013.01); *G06F 2009/45595* (2013.01)

(58) Field of Classification Search
CPC ............... G06F 9/5077; G06F 9/45558; G06F 2009/45575; G06F 2009/45595; G06F 9/455
See application file for complete search history.

(56) References Cited

U.S. PATENT DOCUMENTS

| 9,256,467 | B1* | 2/2016 | Singh ..................... G06F 9/5055 |
| 10,203,967 | B1* | 2/2019 | Atta ..................... H04L 41/0813 |
| 10,841,152 | B1* | 11/2020 | Humphreys ............ H04L 67/10 |
| 2017/0177877 | A1* | 6/2017 | Suarez ................ G06F 21/6218 |
| 2020/0117478 | A1* | 4/2020 | Li ............................ G06F 9/455 |
| 2020/0310775 | A1* | 10/2020 | Nyamars ................... G06F 8/60 |
| 2020/0341754 | A1* | 10/2020 | Kunjuramanpillai ..... G06F 8/71 |
| 2021/0019163 | A1* | 1/2021 | Taylor ....................... G06F 8/63 |
| 2021/0092028 | A1* | 3/2021 | Dwyer .................... H04L 41/40 |
| 2021/0141645 | A1* | 5/2021 | Kramer ................. G06F 9/4416 |
| 2021/0216347 | A1* | 7/2021 | Seshadri ............. G06F 9/45558 |
| 2022/0121470 | A1* | 4/2022 | Saxena ................... H04L 63/20 |

* cited by examiner

*Primary Examiner* — Dong U Kim
(74) *Attorney, Agent, or Firm* — Kim & Stewart LLP

(57) ABSTRACT

A method of delivering cloud services from a cloud platform to management appliances of one or more software-defined data centers (SDDCs) through recipe execution agents running on an agent platform appliance, includes the steps of: downloading a first recipe corresponding to a first event initiated by a first cloud service, wherein the first event is associated with a task to be performed for the first cloud service; and executing first commands defined in the downloaded first recipe in one of the recipe execution agents to perform a task of the first cloud service on a first management appliance, said executing of the first commands in the one of the recipe execution agents including transmitting a first command to the first management appliance, receiving a first response from the first management appliance, and reporting the first response to the cloud platform.

20 Claims, 6 Drawing Sheets

MANAGING EVENTS FOR SERVICES OF A CLOUD PLATFORM IN A HYBRID CLOUD ENVIRONMENT

BACKGROUND

In a software-defined data center (SDDC), virtual infrastructure, which includes virtual machines (VMs) and virtualized storage and networking resources, is provisioned from hardware infrastructure that includes a plurality of host servers, storage devices, and networking devices. The provisioning of the virtual infrastructure is carried out by SDDC management software that is deployed on management appliances, such as a VMware vCenter Server® appliance and a VMware NSX® appliance, available from VMware, Inc. The SDDC management software communicates with virtualization software (e.g., a hypervisor) installed in the host servers to manage the virtual infrastructure.

It has become common for multiple SDDCs to be deployed across multiple clusters of host servers. Each cluster is a group of host servers that are managed together by the management software to provide cluster-level functions, such as load balancing across the cluster through VM migration between the host servers, distributed power management, dynamic VM placement according to affinity and anti-affinity rules, and high availability. The management software also manages a shared storage device to provision storage resources for the cluster from the shared storage device, and a software-defined network, through which the VMs communicate with each other. For some customers, SDDCs are deployed across different geographical regions, and may even be deployed in a hybrid manner, e.g., on-premise, in a public cloud, and/or as a service.

"SDDCs deployed on-premise" means that the SDDCs are provisioned in a private data center that is controlled by a particular organization. "SDDCs deployed in a public cloud" means that SDDCs of a particular organization are provisioned in a public data center along with SDDCs of other organizations. "SDDCs deployed as a service" means that the SDDCs are provided to the organization as a service on a subscription basis. As a result, the organization does not need to carry out management operations on the SDDC such as configuring, upgrading, and patching, and the availability of the SDDCs is provided according to a service-level agreement of the subscription.

With a large number of SDDCs, monitoring and performing operations on the SDDCs through interfaces, e.g., application programming interfaces (APIs), provided by the management software, and managing the lifecycle of the management software, have proven to be challenging. Conventional techniques for managing the SDDCs and the management software of the SDDCs are not practicable when there is a large number of SDDCs, especially when they are spread out across multiple geographical locations and in a hybrid manner.

SUMMARY

Accordingly one or more embodiments provide a method of delivering cloud services from a cloud platform to management appliances of one or more SDDCs through recipe execution agents running on an agent platform appliance. The method includes the steps of: downloading a first recipe corresponding to a first event initiated by a first cloud service, wherein the first event is associated with a task to be performed for the first cloud service; and executing first commands defined in the downloaded first recipe in one of the recipe execution agents to perform a task of the first cloud service on a first management appliance, said executing of the first commands in the one of the recipe execution agents including transmitting a first command to the first management appliance, receiving a first response from the first management appliance, and reporting the first response to the cloud platform.

Further embodiments include a non-transitory computer-readable storage medium comprising instructions that cause a computer system to carry out the above method, as well as a computer system configured to carry out the above method.

DETAILED DESCRIPTION

Techniques for delivering cloud services from a cloud platform to management appliances of a tenant's SDDCs are described. According to embodiments, an agent platform appliance is deployed in a customer environment of the tenant, the customer environment including the tenant's SDDCs, which have management software executing therein. The agent platform appliance is connected to the same management network as management appliances on which the management software is deployed. To connect the tenant's SDDCs to the cloud services of the cloud platform, agents are deployed on the agent platform appliance. The agents perform various functionalities, including transmitting commands to the management software of the SDDCs, acquiring authentication tokens for authenticating with the management software, and acquiring access tokens for authenticating with the cloud services.

Communications between the agent platform appliance and the cloud platform are authenticated using tokens (hereinafter referred to as "access tokens"). Furthermore, communications between the agent platform appliance and the SDDCs are authenticated using tokens (hereinafter referred to as "authentication tokens"). Through the agent platform appliance, the cloud platform delivers cloud services to the management software. These and further aspects of the invention are discussed below with respect to the drawings.

Figure 1:
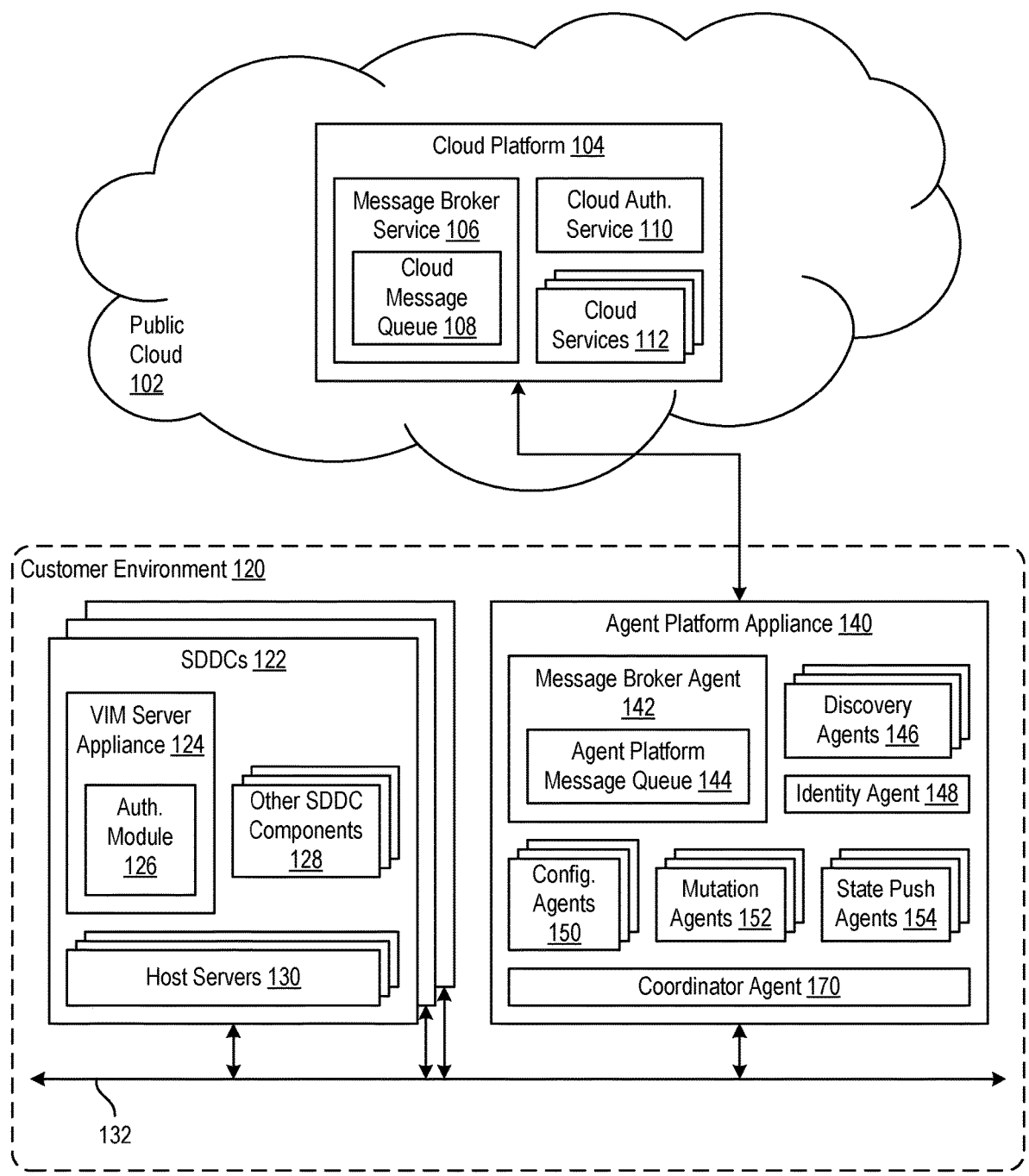
FIG. 1 is a block diagram of a hybrid cloud environment.

FIG. 1 is a block diagram of a hybrid cloud environment, which is a computer system including a public cloud 102 in which a multi-tenant cloud platform 104 is deployed and a customer environment 120 in which SDDCs 122 of a particular tenant are deployed. Communications between cloud platform 104 and SDDCs 122 are carried out via an agent platform appliance 140 of customer environment 120. Communications between cloud platform 104 and agent platform appliance 140 are carried out over a public network such as the Internet.

Each of SDDCs 122 includes host servers 130, host servers 130 being constructed on server grade hardware platforms (not shown) such as x86 architecture platforms. Host servers 130 include conventional components of computing devices (not shown), such as one or more central processing units (CPUs), memory such as random-access memory (RAM), local storage such as one or more magnetic drives or solid-state drives (SSDs) and/or a host bus adapter for connection to a storage area network, and one or more network interface cards (NICs). The NIC(s) enable host servers 130 to communicate with each other and with other devices over a management network 132. Host servers 130 include software platforms including hypervisors (not shown), which are virtualization software layers that support VM execution spaces (not shown) within which VMs are concurrently instantiated and executed. Each of SDDCs 122 also includes additional hardware devices (not shown) such as shared storage and networking devices.

Each of SDDCs 122 includes a VIM server appliance 124 and other SDDC components 128, which are management appliances each running various management software. VIM server appliance 124 logically groups host servers 130 into a cluster to perform cluster-level tasks such as provisioning and managing VMs and migrating VMs from one of host servers 130 to another. One example of VIM server appliance 124 is a VMware vCenter Server® appliance, available from VMware, Inc. Other SDDC components 128 provide other management functionalities such as provisioning virtual networking resources. An example of one of other SDDC components 128 is a VMware NSX® appliance, available from VMware, Inc.

VIM server appliance 124 and other SDDC components 128 communicate via management network 132, and the various management software running thereon are referred to collectively herein as "management software." Management network 132 is distinguishable from the public network connecting agent platform appliance 140 and cloud platform 104, in that management network 132 is a private network, e.g., a local area network (LAN) or sub-net, and is partitioned from the public network through a firewall (not shown). In some embodiments, each of the SDDC components, including VIM server appliance 124, is a VM instantiated on one or more of host servers 130. In other embodiments, each of the SDDC components is implemented as a physical host server having the conventional hardware platform described above with respect to host servers 130.

VIM server appliance 124 includes an authentication module 126, which is software that authenticates requests for access. When it is able to authenticate such requests, authentication module 126 issues role-based authentication tokens such as Security Assertions Markup Language (SAML) tokens. Each authentication token allows a party possessing the token to access VIM server appliance 124 to perform an operation on VIM server appliance 124 that is associated with the issued token. Other SDDC components 128 similarly each include an authentication module (not shown), which issues role-based authentication tokens for requesting parties. For security purposes, authentication tokens each have a specified time-to-live (TTL), after which the tokens expire.

Cloud platform 104 is provisioned in public cloud 102, and public cloud 102 is operated by a cloud computing service provider, from a plurality of physical host servers (not shown). Cloud platform 104 includes a message broker service 106, a cloud authentication service 110, and cloud services 112. Message broker service 106 provides for secure communications with cloud services 112, as discussed further below. Cloud authentication service 110 enables authentication with services of cloud platform 104. To enable such authentication, cloud authentication service 110 issues access tokens such as JavaScript Object Notation (JSON) web tokens (JWTs). It should be noted that although cloud authentication service 110 is illustrated as being within cloud platform 104, cloud authentication service 110 may run on a virtual or physical server that is not part of cloud platform 104. For security purposes, access tokens each have a specified TTL, after which the tokens expire.

Cloud services 112 include an SDDC configuration service, an SDDC mutation service, an SDDC state push service, an SDDC upgrade service, an SDDC monitoring service, and an SDDC inventory service. For example, the SDDC configuration service manages configurations of SDDCs according to desired states, the SDDC mutation service creates and deletes VMs in SDDCs, and the SDDC state push service ensures that tenants are allowed to login to SDDC components.

Agent platform appliance 140 is, e.g., a physical server, or a VM deployed on a host server similar to host servers 130, the host server including a CPU(s) configured to execute instructions such as executable instructions that perform one or more operations described herein and including memory in which such executable instructions are stored. Agent platform appliance 140 is connected to management network 132 such that agent platform appliance 140 and SDDCs 122 are on the same side of a firewall (not shown) of customer environment 120. As a result, communications between agent platform appliance 140 and SDDCs 122 are secure and protected from attacks originating from outside customer environment 120 such as snooping attacks.

On agent platform appliance 140, various agents are deployed, including a message broker agent 142, discovery agents 146, an identity agent 148, SDDC configuration agents 150, SDDC mutation agents 152, SDDC state push agents 154, and a coordinator agent 170. The agents on agent platform appliance 140 communicate with each other, e.g., through hypertext transfer protocol (HTTP) APIs. The agents on agent platform appliance 140 also communicate with SDDCs 122 and cloud platform 104. Coordinator agent 170 deploys the agents on agent platform appliance 140, managing the lifecycle and orchestration thereof.

SDDC configuration agents 150 correspond to the SDDC configuration service, SDDC mutation agents 152 correspond to the SDDC mutation service, and SDDC state push agents 154 correspond to the SDDC state push service. SDDC configuration agents 150, SDDC mutation agents 152, and SDDC state push agents 154 are collectively referred to herein as "cloud service agents." Each of the cloud service agents corresponds to one type of management software for one of SDDCs 122. For example, SDDC configuration agents 150, SDDC mutation agents 152, and SDDC state push agents 154 interact with VIM server appliance 124 of SDDCs 122. Accordingly, one of each of the illustrated cloud service agents corresponds to VIM server appliance 124 for one of SDDCs 122. However, it should be understood that there are other cloud service agents (not shown) corresponding to other SDDC components 128 of SDDCs 122. The cloud service agents issue commands to the management software of SDDCs 122 and report results of operations to respective cloud services 112.

Through message broker agent 142, the cloud service agents communicate with cloud services 112. The cloud service agents transmit messages to message broker agent 142, referred to herein as "agent-to-cloud" messages. Each agent-to-cloud message includes the name of one of cloud services 112, which is the intended recipient. Message broker agent 142 temporarily stores agent-to-cloud messages in an agent platform message queue 144. Similarly, cloud services 112 transmit messages to message broker service 106. Each message from one of cloud services 112, referred to herein as a "cloud-to-agent" message, includes the name of one of the cloud service agents as the intended recipient. Message broker service 106 temporarily stores cloud-to-agent messages in queues corresponding to various tenants, including a cloud message queue 108 corresponding to the tenant of SDDCs 122.

To provide agent-to-cloud messages to cloud services 112 and cloud-to-agent messages to the cloud service agents, message broker service 106 and message broker agent 142 exchanges messages, e.g., periodically. Specifically, message broker agent 142 initiates the exchange with message broker service 106. Message broker agent 142 transmits agent-to-cloud messages from agent platform message queue 144 to message broker service 106, which forwards them to cloud services 112. In exchange, message broker service 106 transmits cloud-to-agent messages from cloud message queue 108 to message broker agent 142, which forwards them to the cloud service agents.

Discovery agents 146 are deployed on agent platform appliance 140 to manage communication with the management software of SDDCs 122. Each of discovery agents 146 corresponds to one type of management software for all of SDDCs 122. For example, one discovery agent is deployed for VIM server appliances 124 of all of SDDCs 122, and other discovery agents are deployed respectively for other SDDC components 128 of all of SDDCs 122. Each of discovery agents 146 communicates with its respective SDDC components, such as VIM server appliance 124, to acquire authentication tokens. To enable this, each of discovery agents 146 maintains a set of privilege mappings (not shown), the privilege mappings indicating which "roles" agents deployed on agent platform appliance 140, are authorized for, and what privileges are associated with these roles.

Identity agent 148 is deployed on agent platform appliance 140 to acquire access tokens from cloud authentication service 110. Identity agent 148, when deployed, is given access to a private key of the tenant and transmits a challenge phrase that is signed with the private key as payload for authenticating with cloud authentication service 110. In response, cloud authentication service 110 decrypts the payload using a public key of the tenant and issues an access token for the tenant if the decrypted payload matches the challenge phrase. The access token enables message broker agent 142 to authenticate with cloud platform 104.

Each of the services of cloud platform 104 may be a microservice that is implemented as one or more container images executing on a virtual infrastructure of public cloud 102. Similarly, each of the agents deployed on agent platform appliance 140 may be a microservice that is implemented as one or more container images executing in agent platform appliance 140. In the hybrid cloud environment illustrated in FIG. 1, increasing the numbers of cloud services 112 delivered to SDDCs 122, the numbers of SDDCs 122, and the numbers of SDDC components involves deploying more cloud service agents such as those illustrated in FIG. 1. For example, deploying another SDDC with another VIM server appliance involves deploying another SDDC configuration agent, another SDDC mutation agent, and another SDDC state push agent through which the SDDC configuration service, SDDC mutation service, and SDDC state push service are provided to the newly deployed SDDC. Each of these additional agents consumes memory of agent platform appliance 140, even when the additional agents are not performing commands. Furthermore, even if the cloud service agents are only booted up when they are needed, the boot-ups consume significant CPU resources and introduce inherent delays.

Figure 2:
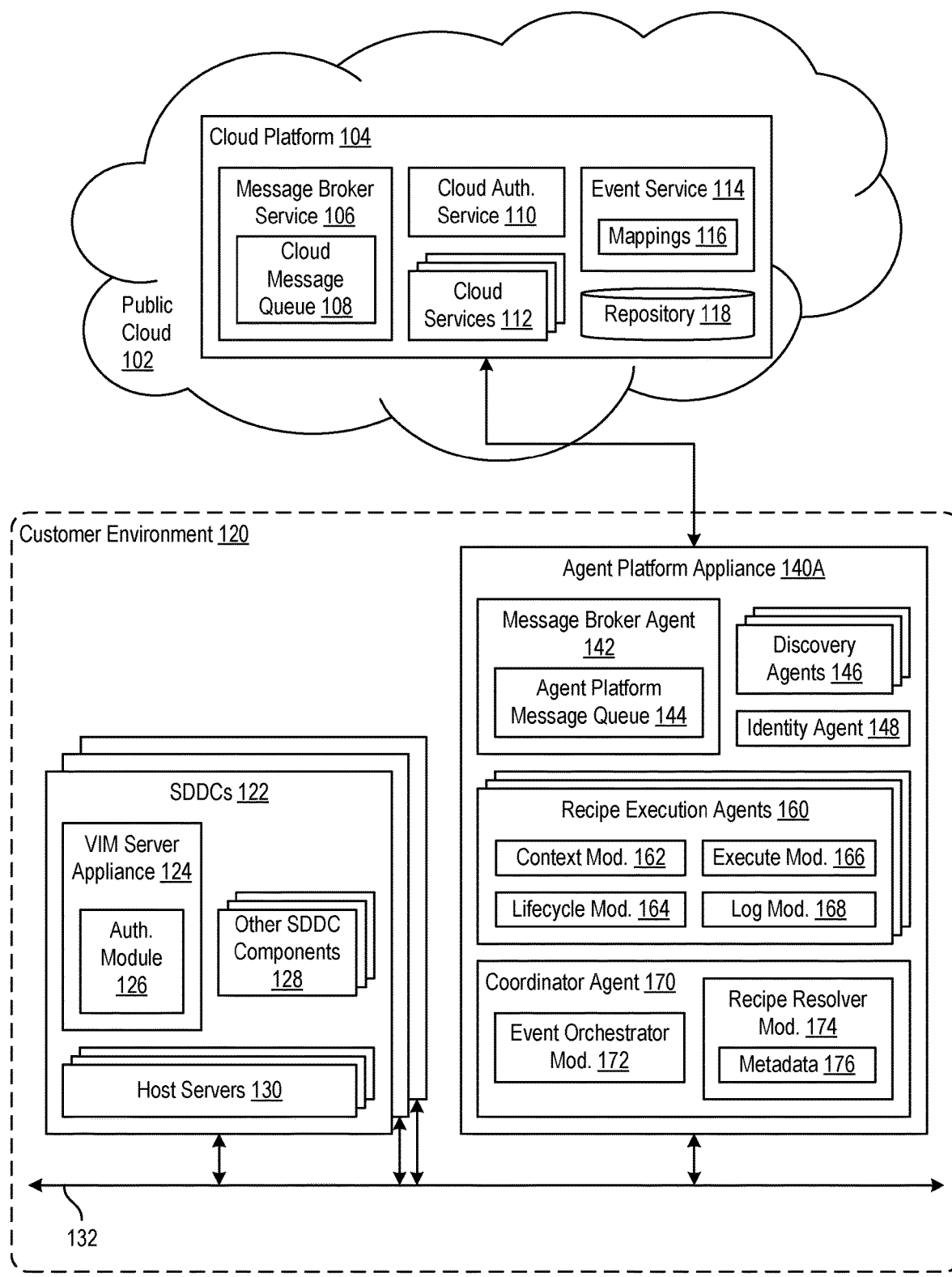
FIG. 2 is a block diagram of a hybrid cloud environment including an agent platform appliance according to embodiments.

FIG. 2 is a block diagram of a hybrid cloud environment, which is a computer system including public cloud 102 and customer environment 120, in which an agent platform appliance 140A according to embodiments may be implemented. In the embodiments, instead of deploying individual cloud service agents specific to each of cloud services 112, a high availability (HA) set of recipe execution agents 160 are deployed on agent platform appliance 140A. Each of recipe execution agents 160 is configured to execute commands defined in "recipes" to perform tasks for any of cloud services 112. As used herein, a recipe is an ordered set of commands to be performed by one of recipe execution agents 160. Such commands, also referred to herein as "steps," include function calls which may invoke APIs of, e.g., SDDC components. Each step may also include metadata such as a "retry-count" indicating a minimum number of times to try executing a step before reporting failure of a recipe, an "abort-recipe-upon-failure" exception that is triggered to stop executing the recipe if the step is not successfully executed, a "next-step-for-success" value naming a next step to execute if the current step is successfully executed, and a "next-step-for-failure" value naming a next step to execute if the current step is not successfully executed.

Cloud services 112 trigger "events," which are associated with tasks to be performed for cloud services 112. For example, to create a VM in one of SDDCs 122, the SDDC mutation service triggers an event that is associated with the task of creating a VM. An event service 114 is deployed on cloud platform 104 that determines, given a name of an event, a corresponding recipe. To perform such determinations, event service 114 maintains a set of mappings 116 between names of events and identifiers (IDs) of recipes. Mappings 116 also include additional information such as current version numbers of recipes.

Recipes are available to be downloaded from a recipe repository 118 of cloud platform 104. It should be noted that although recipe repository 118 is illustrated as being within cloud platform 104, recipe repository 118 may run on a virtual or physical server that is not part of cloud platform 104. For example, recipe repository 118 may be a publicly hosted content delivery network (CDN). It should also be noted that recipe execution agents 160 are deployed onto and run on agent platform appliance 140A prior to recipes being downloaded to agent platform appliance 140A.

Coordinator agent 170 includes an event orchestrator module 172 and a recipe resolver module 174 for managing the recipes executed by recipe execution agents 160. Event orchestrator module 172 provides recipes to recipe execution agents 160 and instructs recipe execution agents 160 when to execute the recipes. Recipe resolver module 174 downloads recipes from recipe repository 118 when needed, i.e., when a selected one of recipe execution agents 160 does not have the latest version of a recipe to execute, Recipe resolver module 174 maintains metadata 176 including IDs and version numbers of recipes that have been provided to each of recipe execution agents 160.

Each of recipe execution agents 160 includes a context module 162, a lifecycle module 164, an execute module 166, and a log module 168. Context module 162 maintains "context parameters" of a recipe being executed such as an ID of an SDDC component and a name of a role that is associated with privileges for executing the recipe. Lifecycle module 164 manages the lifecycle of executing the recipe, including identifying commands of the recipe to be performed by execute module 166. Log module 168 collects logs generated during the execution of the recipe to be passed to a separate log agent (not shown) for analysis. During the execution of recipes, recipe execution agents 160 store data such as outputs of steps, which recipe execution agents 160 delete upon completion of the recipes.

Embodiments offer various advantages over the hybrid cloud environment of FIG. 1. Firstly, because each of recipe execution agents 160 is configured to execute the same recipes for any of cloud services 112, the embodiments are more scalable with the numbers of cloud services 112, SDDCs 122, and SDDC components. Such numbers may be increased without deploying additional agents on agent platform appliance 140A. Additionally, new functionalities may be delivered to SDDCs 122 without upgrading agent platform appliance 140A. Instead, new recipes and updated versions of recipes may be downloaded, which are relatively small, e.g., kilobytes in size.

Figure 3A:
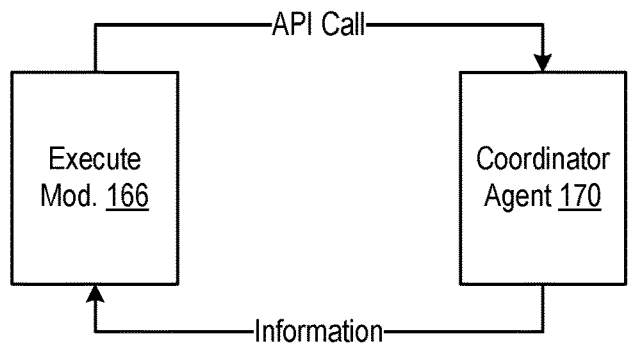
FIG. 3A is a conceptual diagram illustrating an example of executing a step of a recipe by requesting information from an agent of an agent platform appliance.

FIG. 3A is a conceptual diagram illustrating an example of executing a step of a recipe by requesting information from an agent of agent platform appliance 140A. In the example of FIG. 3A, the step is a command to request information from coordinator agent 170. Accordingly, execute module 166 makes an HTTP API call to coordinator agent 170, requesting the information specified by the step. In response, coordinator agent 170 retrieves the requested information and transmits the information to execute module 166. For example, the information may be connectivity information indicating whether agent platform appliance 140A is currently connected to cloud platform 104.

Figure 3B:
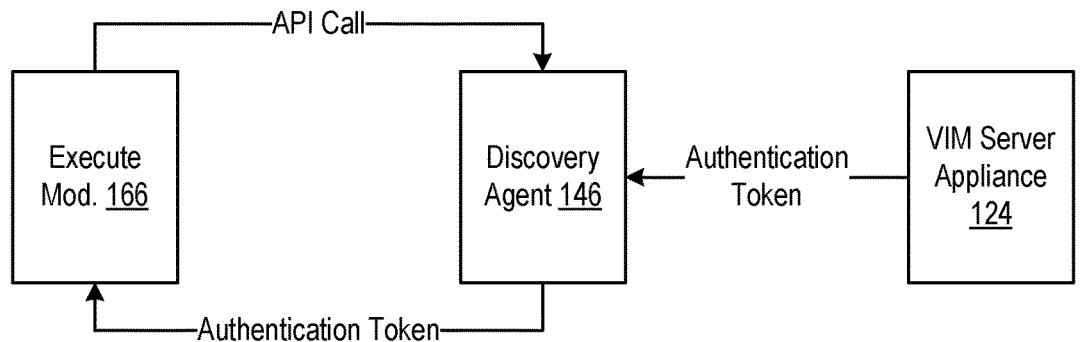
FIG. 3B is a conceptual diagram illustrating an example of executing a step of a recipe by requesting an authentication token from another agent of the agent platform appliance for authenticating with a component of an SDDC.

FIG. 3B is a conceptual diagram illustrating an example of executing a step of a recipe by requesting an authentication token from one of discovery agents 146 for authenticating with a component of one of SDDCs 122. For example, to execute a recipe involving VIM server appliance 124 of one of SDDCs 122, execute module 166 communicates with discovery agent 146 corresponding to VIM server appliance 124. Specifically, execute module 166 makes an HTTP API call to discovery agent 146 including the name of a role specified by the step. Discovery agent 146 then acquires an authentication token that is scoped to the requested role, from VIM server appliance 124 via authentication module 126. Discovery agent 146 then returns the authentication token to execute module 166.

Figure 3C:
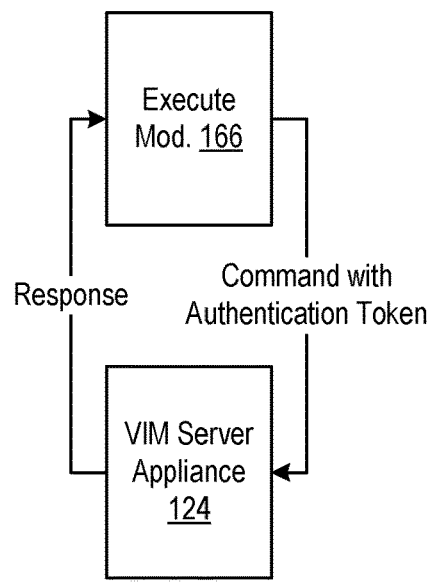
FIG. 3C is a conceptual diagram illustrating an example of executing a step of a recipe by issuing a command to the SDDC component.

FIG. 3C is a conceptual diagram illustrating an example of executing a step of a recipe by issuing a command to an SDDC component, e.g., VIM server appliance 124 of one of SDDCs 122. Execute module 166 identifies VIM server appliance 124 of the one of SDDCs 122 based on an ID of VIM server appliance 124. Execute module 166 then issues the command to identified VIM server appliance 124 along with an authentication token scoped to a particular role. The role is associated with a privilege that allows for requesting the command to be performed. Upon verifying that the request is within the scope of the authentication token, VIM server appliance 124 performs the command and transmits a response to the command to execute module 166.

Figure 3D:
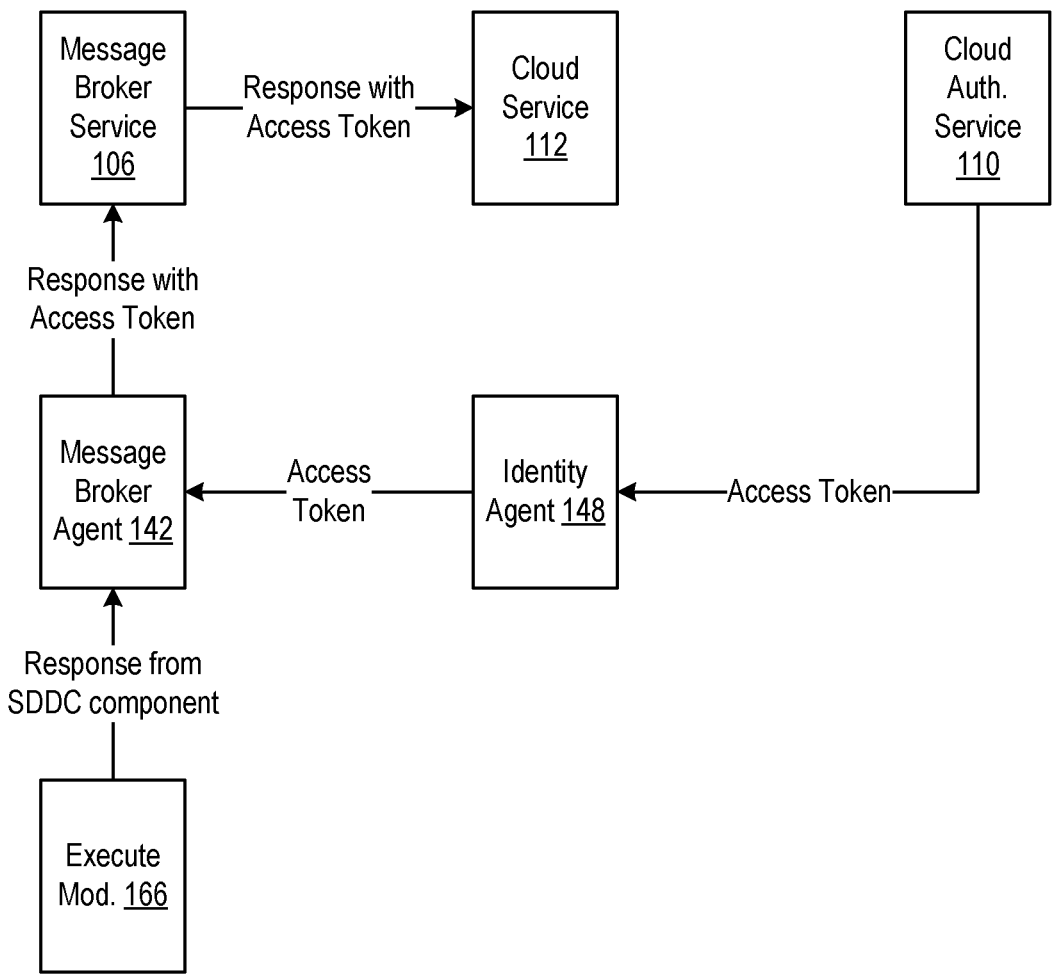
FIG. 3D is a conceptual diagram illustrating an example of executing a step of a recipe by reporting a response from the SDDC component to a cloud service of a cloud platform.

FIG. 3D is a conceptual diagram illustrating an example of executing a step of a recipe by reporting a response from an SDDC component to one of cloud services 112. Execute module 166 makes an HTTP API call to transmit the response from the SDDC component to message broker agent 142 as a message. Message broker agent 142 stores the message in agent platform message queue 144 and requests an access token from identity agent 148. Identity agent 148 acquires the access token from cloud authentication service 110 by transmitting a signed challenge phrase, as discussed above, and provides the access token to message broker agent 142. Then, e.g., after a predetermined time period elapses, message broker agent 142 initiates an exchange of messages with message broker service 106. Message broker agent 142 transmits the response from the SDDC component along with the access token to message broker service 106. Message broker service 106 then forwards the response and access token to cloud service 112.

The steps illustrated in FIGS. 3A-3D may be used for executing various recipes. As a first example, the SDDC mutation service may trigger an event associated with a task for creating a VM in a particular one of SDDCs 122. The first step of the corresponding recipe may be to acquire an authentication token scoped to a particular role, as described above in conjunction with FIG. 3B. The second step may be to issue a command to VIM server appliance 124 to create a VM along with the authentication token acquired in step one, as described above in conjunction with FIG. 3C. The third step may be to report a response from VIM server appliance 124 to the SDDC mutation service, as described above in conjunction with FIG. 3D. The response may be, e.g., an indication that the VM was successfully created.

As a second example, the SDDC state push service may trigger an event associated with a task for checking the connection of agent platform appliance 140A to cloud platform 104. The first step of the corresponding recipe may be to acquire connection information from coordinator agent 170, as described above in conjunction with FIG. 3A. The second step may be to acquire an authentication token scoped to a particular role, as described above in conjunction with FIG. 3B. The third step may be to issue a command to VIM server appliance 124 to update connection information stored therein to match the connection information acquired from coordinator agent 170. For example, if agent platform appliance 140A is disconnected from cloud platform 104 such that subscription information of the tenant cannot be verified, VIM server appliance 124 may restrict access thereto.

Figure 4:
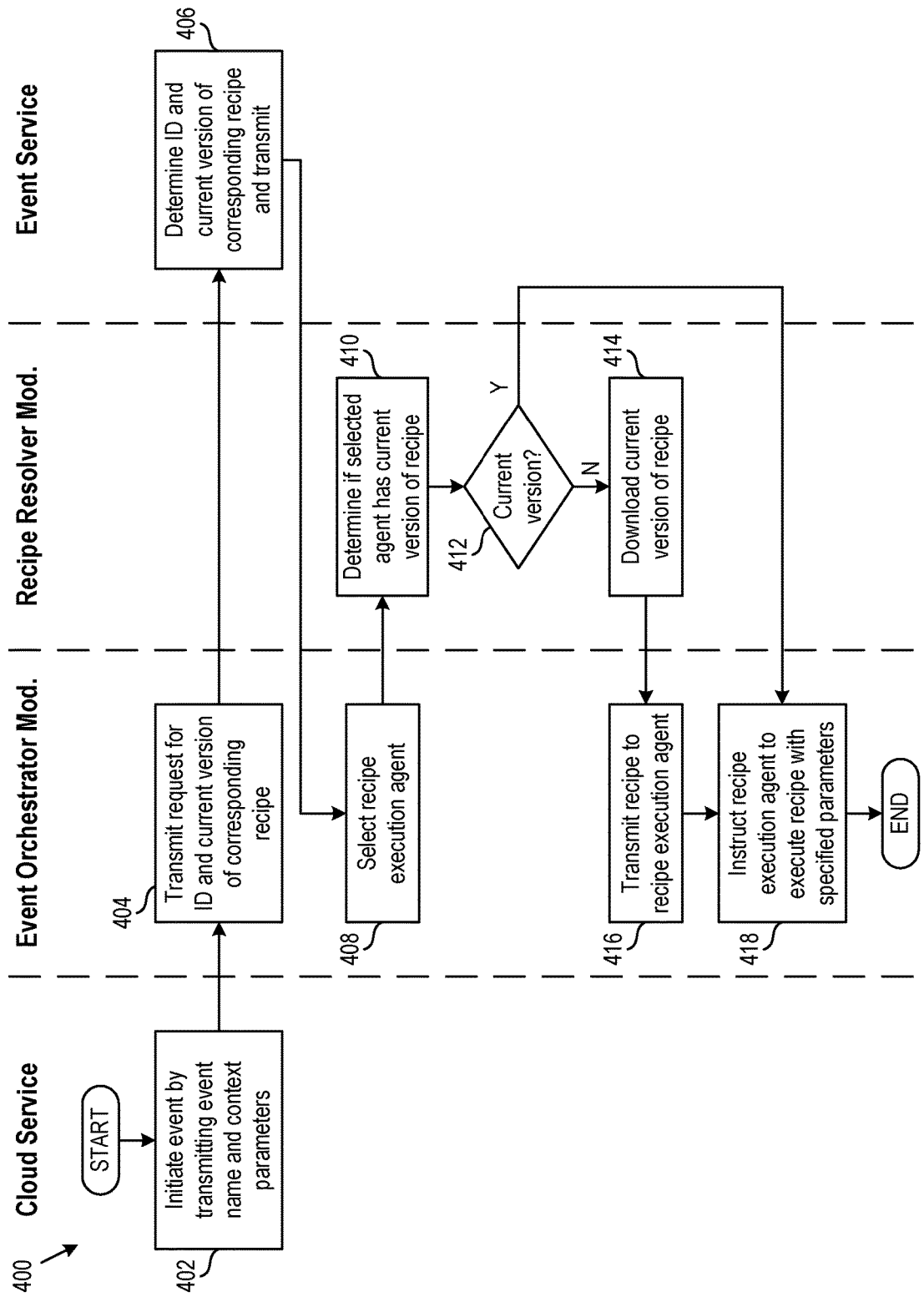
FIG. 4 is a flow diagram of steps performed by services of the cloud platform and an agent of the agent platform appliance to carry out a method of managing an event initiated by a cloud service, according to an embodiment.

FIG. 4 is a flow diagram of steps performed by one of cloud services 112, coordinator agent 170, and event service 114 to carry out a method 400 of managing an event initiated by cloud service 112, according to an embodiment. At step 402, cloud service 112 initiates an event by transmitting an event name and context parameters to coordinator agent 170 as a cloud-to-agent message via message broker agent 142 and message broker service 106. The context parameters include information such as an identifier of an SDDC component and a name of a role that is associated with privileges for executing a corresponding recipe.

At step 404, event orchestrator module 172 transmits a request for an ID and current version of the corresponding recipe, to event service 114 as an agent-to-cloud message via message broker agent 142 and message broker service 106. At step 406, event service 114 determines the ID and current version of the corresponding recipe by checking mappings 116. Event service 114 then transmits the ID and current version to coordinator agent 170 as a cloud-to-agent message via message broker agent 142 and message broker service 106. At step 408, event orchestrator module 172 selects one of recipe execution agents 160 to execute the recipe. For example, event orchestrator module 172 may select the one of recipe execution agents 160 that is the least loaded or any one of recipe execution agents 160 that is not already executing a recipe.

At step 410, recipe resolver module 174 determines if selected recipe execution agent 160 has the current version of the recipe. Recipe resolver module 174 makes this determination by checking metadata 176 to determine if coordinator agent 170 has previously transmitted the current version of the identified recipe to recipe execution agent 160. If so, recipe execution agent 160 is expected to still have the recipe, e.g., stored in the memory of agent platform appliance 140A. At step 412, if recipe execution agent 160 has the current version of the recipe, method 400 moves to step 418.

Otherwise, method 400 moves to step 414, and recipe resolver module 174 downloads the current version of the recipe from recipe repository 118 by transmitting a request that includes the name of the recipe. In response, recipe repository 118 returns the current version of the recipe to coordinator agent 170. At step 416, event orchestrator module 172 transmits the downloaded recipe to selected recipe execution agent 160. The transmission may be the first time the recipe has been provided to recipe execution agent 160 or may be an updated recipe. At step 418, event orchestrator module 172 instructs selected recipe execution agent 160 to execute the up-to-date recipe with the context parameters specified by cloud service 112. After step 418, method 400 ends.

Figure 5:
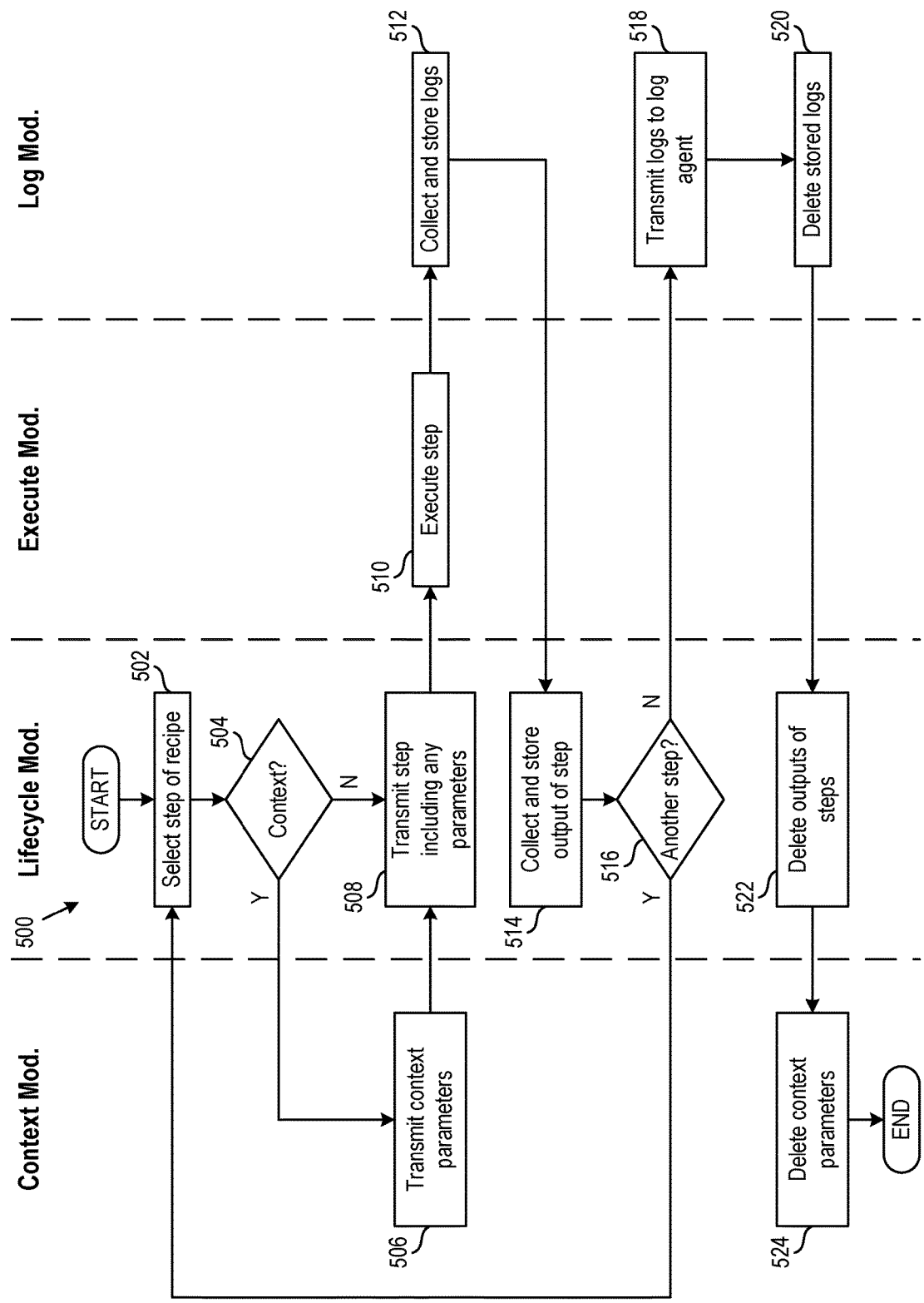
FIG. 5 is a flow diagram of steps performed by modules of a recipe execution agent of the agent platform appliance to carry out a method of performing steps of a recipe corresponding to the event, according to an embodiment.

FIG. 5 is a flow diagram of steps performed by modules of one of recipe execution agents 160 to carry out a method 500 of performing steps of a recipe, according to an embodiment. At step 502, lifecycle module 164 selects a step of the recipe. At step 504, if there are one or more context parameters associated with the selected step, method 500 moves to step 506, context module 162 transmits the one or more context parameters to lifecycle module 164, and method 500 moves to step 508. Otherwise, at step 504, if there are no such context parameters, method 500 moves directly to step 508.

At step 508, lifecycle module 164 transmits the step to execute module 166 along with any parameters used by the step. Such parameters may include context parameters received from context module 162 or outputs from previous steps of the recipe. For example, if the currently selected step of the recipe is a second step, the parameters may include an output from the first step. At step 510, execute module 166 executes the currently selected step. For example, execute module 166 may request information from an agent of agent platform appliance 140A, request an authentication token from one of discovery agents 146, issue a command to an SDDC component, or report a response from an SDDC component to one of cloud services 112, as described above in conjunction with FIGS. 3A-3D.

At step 512, if there are any logs to collect based on the execution of the step, log module 168 collects the logs and stores them in the memory of agent platform appliance 140A. Such logs contain information about usage patterns, activities, and operations of the entities generating the logs. At step 514, lifecycle module 164 collects and stores the output of the step executed at step 510. For example, the output of the step may be information from an agent of agent platform appliance 140A, an authentication token, or a response from an SDDC component. At step 516, if there is another step of the recipe to execute, method 500 returns to step 502, and lifecycle module 164 selects the next step.

Otherwise, if there are no more steps, method 500 moves to step 518, and log module 168 transmits any collected logs to a log agent of agent platform appliance 140A for analysis. At step 520, log module 168 deletes any logs stored thereby in the memory of agent platform appliance 140A. At step 522, lifecycle module 164 deletes outputs of steps executed by execute module 166 from the memory of agent platform appliance 140A. At step 524, context module 162 deletes any context parameters used for executing the recipe. After step 524, method 500 ends. It should be noted that steps 520-524 may alternatively be incorporated into a recipe, in which case the logs, outputs of steps, and context parameters are deleted during the execution of steps of the recipe.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations. The embodiments described herein may also be practiced with computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer-readable media. The term computer-readable medium refers to any data storage device that can store data that can thereafter be input into a computer system. Computer-readable media may be based on any existing or subsequently developed technology that embodies computer programs in a manner that enables a computer to read the programs. Examples of computer-readable media are hard disk drives (HDDs), SSDs, network-attached storage (NAS) systems, read-only memory (ROM), RAM, compact disks (CDs), digital versatile disks (DVDs), magnetic tapes, and other optical and non-optical data storage devices. A computer-readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Virtualized systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data. Many variations, additions, and improvements are possible, regardless of the degree of virtualization. The virtualization software can therefore include components of a host, console, or guest operating system (OS) that perform virtualization functions.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined component. Similarly, structures and functionalities presented as a single component may be implemented as separate components. These and other variations, additions, and improvements may fall within the scope of the appended claims.

What is claimed is:

1. A method of delivering cloud services from a cloud platform to management appliances of one or more software-defined data centers (SDDCs) through an agent platform appliance, the agent platform appliance being connected to the one or more SDDCs via a management network within a customer environment that is separate from the cloud platform, said method comprising:
   receiving, by the agent platform appliance from the cloud platform, first event information associated with executing a first recipe, wherein the first event information originates from a first cloud service of the cloud services, and the first recipe defines a plurality of first commands to perform on a first management appliance in a first SDDC of the one or more SDDCs;
   downloading the first recipe, by the agent platform appliance from the cloud platform in response to receiving the first event information; and
   executing, by a first recipe execution agent of a plurality of high availability (HA) recipe execution agents within the agent platform appliance, the first commands defined in the downloaded first recipe on the first management appliance, said executing of the first commands on the first management appliance including transmitting a first command to the first management appliance via the management network, receiving a first response from the first management appliance via the management network, and reporting the first response to the cloud platform.

2. The method of claim 1, further comprising:
   receiving, by the agent platform appliance from the cloud platform, second event information associated with executing a second recipe, wherein the second event information originates from a second cloud service of the cloud services, and the second recipe defines a plurality of second commands to perform on the first management appliance;
   downloading the second recipe, by the agent platform appliance from the cloud platform in response to receiving the second event information; and
   executing, by a second recipe execution agent of the HA recipe execution agents, the second commands defined in the downloaded second recipe on the first management appliance, said executing of the second commands on the first management appliance including transmitting a second command to the first management appliance via the management network.

3. The method of claim 2, wherein the first cloud service is a mutation service configured to create and delete virtual machines in the first SDDC, and the second cloud service is a state push service configured to trigger an event associated with checking a network connection of the agent platform appliance to the cloud platform.

4. The method of claim 1, further comprising:
   receiving, by the agent platform appliance from the cloud platform, second event information associated with executing the first recipe on a second management appliance; and
   executing, by a second recipe execution agent of the HA recipe execution agents in response to the agent platform appliance receiving the second event information, the first commands defined in the downloaded first recipe on the second management appliance, said executing of the first commands on the second management appliance including transmitting the first command to the second management appliance via the management network, receiving a second response from the second management appliance via the management network, and reporting the second response to the cloud platform.

5. The method of claim 4, wherein the one or more SDDCs includes a plurality of SDDCs, the first management appliance is a virtual infrastructure management appliance configured to provision and manage virtual machines in the first SDDC, and the second management appliance is a virtual infrastructure management appliance configured to provision and manage virtual machines in a second SDDC of the plurality of SDDCs.

6. The method of claim 4, further comprising:
   downloading, by the agent platform appliance from the cloud platform, an update to the downloaded first recipe prior to said executing of the first commands on the second management appliance, to execute the first commands with the update on the second management appliance.

7. The method of claim 1, further comprising:
   deploying the HA recipe execution agents onto and running the HA recipe execution agents on the agent platform appliance, prior to said downloading.

8. The method of claim 1, wherein the HA recipe execution agents are each configured to execute commands defined in a plurality of recipes including the first recipe.

9. The method of claim 1, wherein said executing of the first commands on the first management appliance includes the first recipe execution agent collecting and storing outputs of the first commands, said method further comprising:
   deleting, by the first recipe execution agent, the outputs of the first commands after said reporting of the first response to the cloud platform.

10. A non-transitory computer-readable medium comprising instructions that are executable in a physical server supporting an agent platform appliance, wherein the instructions when executed cause the physical server to carry out a method of delivering cloud services from a cloud platform to management appliances of one or more software-defined data centers (SDDCs) through the agent platform appliance, and the agent platform appliance is connected to the one or more SDDCs via a management network within a customer environment that is separate from the cloud platform, said method comprising:

receiving, from the cloud platform, first event information associated with executing a first recipe, the first event information originating from a first cloud service of the cloud services, and the first recipe defining a plurality of first commands to perform on a first management appliance in a first SDDC of the one or more SDDCs;

downloading the first recipe from the cloud platform in response to receiving the first event information; and executing, using a first recipe execution agent of a plurality of high availability (HA) recipe execution agents within the agent platform appliance, the first commands defined in the downloaded first recipe on the first management appliance, said executing of the first commands on the first management appliance including transmitting a first command to the first management appliance via the management network, receiving a first response from the first management appliance via the management network, and reporting the first response to the cloud platform.

11. The non-transitory computer-readable medium of claim 10, said method further comprising:

receiving, from the cloud platform, second event information associated with executing a second recipe, the second event information originating from a second cloud service of the cloud services, and the second recipe defining a plurality of second commands to perform on the first management appliance;

downloading the second recipe from the cloud platform in response to receiving the second event information; and executing, using a second recipe execution agent of the HA recipe execution agents, the second commands defined in the downloaded second recipe on the first management appliance, said executing of the second commands on the first management appliance including transmitting a second command to the first management appliance via the management network.

12. The non-transitory computer-readable medium of claim 11, wherein the first cloud service is a mutation service configured to create and delete virtual machines in the first SDDC, and the second cloud service is a state push service configured to trigger an event associated with checking a network connection of the agent platform appliance to the cloud platform.

13. The non-transitory computer-readable medium of claim 10, said method further comprising:

receiving, from the cloud platform, second event information associated with executing the first recipe on a second management appliance; and executing, using a second recipe execution agent of the HA recipe execution agents in response to the agent platform appliance receiving the second event information, the first commands defined in the downloaded first recipe on the second management appliance, said executing of the first commands on the second management appliance including transmitting the first command to the second management appliance via the management network, receiving a second response from the second management appliance via the management network, and reporting the second response to the cloud platform.

14. The non-transitory computer-readable medium of claim 13, wherein the one or more SDDCs includes a plurality of SDDCs, the first management appliance is a virtual infrastructure management appliance configured to provision and manage virtual machines in the first SDDC, and the second management appliance is a virtual infrastructure management appliance configured to provision and manage virtual machines in a second SDDC of the plurality of SDDCs.

15. The non-transitory computer-readable medium of claim 13, said method further comprising:

downloading, from the cloud platform, an update to the downloaded first recipe prior to said executing of the first commands on the second management appliance, to execute the first commands with the update on the second management appliance.

16. The non-transitory computer-readable medium of claim 10, said method further comprising:

deploying the HA recipe execution agents onto and running the HA recipe execution agents on the agent platform appliance, prior to said downloading.

17. A physical server including a processor and memory supporting an agent platform appliance, wherein the agent platform appliance is connected to one or more software-defined data centers (SDDCs) via a management network within a customer environment that is separate from a cloud platform, and the processor executes instructions stored in the memory to:

receive, from the cloud platform, first event information associated with executing a first recipe, the first event information originating from a first cloud service of a plurality of cloud services from the cloud platform, and the first recipe defining a plurality of first commands to perform on a first management appliance in a first SDDC of the one or more SDDCs;

download the first recipe from the cloud platform in response to receiving the first event information; and execute, using a first recipe execution agent of a plurality of high availability (HA) recipe execution agents within the agent platform appliance, the first commands defined in the downloaded first recipe on the first management appliance, said executing of the first commands on the first management appliance including transmitting a first command to the first management appliance via the management network, receiving a first response from the first management appliance via the management network, and reporting the first response to the cloud platform.

18. The physical server of claim 17, wherein the processor further executes the instructions stored in the memory to:

deploy the HA recipe execution agents onto and run the HA recipe execution agents on the agent platform appliance, prior to said downloading.

19. The physical server of claim 17, wherein the HA recipe execution agents are each configured to execute commands defined in a plurality of recipes including the first recipe.

20. The physical server of claim 17, wherein said executing of the first commands on the first management appliance includes the first recipe execution agent collecting and storing outputs of the first commands, and the processor further executes the instructions stored in the memory to:

delete, using the first recipe execution agent, the outputs of the first commands after said reporting of the first response to the cloud platform.

* * * * *